US006913727B2

United States Patent
Chen

(10) Patent No.: US 6,913,727 B2
(45) Date of Patent: Jul. 5, 2005

(54) METHOD OF MANUFACTURING GOLF CLUB HEAD OF COMPOSITE MATERIAL

(76) Inventor: Archer C. C. Chen, No. 501, 28th Road.,Taichung Industrial Park, Taichung (TW)

(*) Notice: Subject to any disclaimer, the term of this patent is extended or adjusted under 35 U.S.C. 154(b) by 269 days.

(21) Appl. No.: 10/265,881

(22) Filed: Oct. 8, 2002

(65) Prior Publication Data

US 2004/0021252 A1 Feb. 5, 2004

(30) Foreign Application Priority Data

Aug. 5, 2002 (TW) ...................................... 91118050 A

(51) Int. Cl.⁷ .............................................. B29C 43/04
(52) U.S. Cl. ..................... 264/320; 264/325; 425/383
(58) Field of Search ......................... 425/383; 264/319, 264/325

(56) References Cited

U.S. PATENT DOCUMENTS 5,151,322 A * 9/1992 Kimoto et al. ........... 428/299.1
6,623,378 B2 * 9/2003 Beach et al. ................ 473/345
6,695,608 B2 * 2/2004 Murphy et al. ............. 425/398

FOREIGN PATENT DOCUMENTS

JP 64-68284 * 3/1989

* cited by examiner

*Primary Examiner*—Edmund H. Lee
(74) *Attorney, Agent, or Firm*—Browdy and Neimark, P.L.L.C.

(57) ABSTRACT

A method of manufacturing a golf club head of composite material includes the steps of combining a first and a second dies having recessed portions and at least on tunnel portion respectively to form a mold cavity, putting a bulk molding compound (B.M.C.) into the mold cavity, compressing a mold plunger into the mold cavity through the tunnel portion such that a mold space, which is defined by a mold portion of the mold plunger and the recessed portions of the dies, is filled with the B.M.C., and then separating the first die, the second die and the mold plunger while the B.M.C. is solidified to get a golf club head with a shape corresponding to the mold space.

8 Claims, 6 Drawing Sheets

METHOD OF MANUFACTURING GOLF CLUB HEAD OF COMPOSITE MATERIAL

FIELD OF THE INVENTION

The present invention relates to a golf club, and more particularly to a method of manufacturing golf club heads of composite material.

BACKGROUND OF THE INVENTION

A conventional golf club head, especially a so-called wood club head, of metal, was made from welding two or three metal pieces to construct a hollow head. For example, a wood club head can be constructed from a bottom, a crown and a face, or it also can be constructed from a crown and a bottom with a face thereon. Except for metal, more and more wood heads were made of composite material, such as carbon composite, which has capacities of lighter weight, higher strength and well elasticity etc. But, there were some unsolved problems when manufacturing the golf club heads of composite material.

SUMMARY OF THE INVENTION

The primary objective of the present invention is to provide a method of manufacturing a golf club head of composite material, which can manufacture the composite golf club head in an easier and faster way.

According to the objective of the present invention, a method of manufacturing a golf club head of composite material comprises the following steps.

1. Arrange a first die, a second die and a mold plunger. The first die and the second die can be driven by an external force to combine with or separate from each other. The first die has a first cavity having a recessed portion at a side thereof and the second die has a second cavity having a recessed portion at the side facing the recessed portion of the first cavity of the first die such that the recessed portions of the first and second cavities are combined with each other when said first die and said second die are brought together. At least one of the first and second cavities of said first and second dies is provided with a tunnel portion extending inwardly from a side of the respective die to the recessed portion of the respective cavity. The mold plunger has a mold portion at an end thereof and a plunger portion at the other end thereof and the mold portion can be removably inserted into the recessed portions of the first and second cavities through said tunnel portion.

2. Brite Bring together the first die and the second die such that a mold cavity is defined by said first cavity of the first die and the second cavity of the second die.

3. Put a bulk molding compound (B.M.C.) into the mold cavity.

4. Compress the mold plunger into the mold cavity through the tunnel portion until the tunnel portion is sealed by the plunger portion of the mold plunger such that a mold space is defined in between the recessed portions of the first and second cavities and the mold portion of the mold plunger and the mold space is filled with said bulk molding compound.

5. Solidify the compressed bulk molding compound, and then separate the first die, the second die and the mold plunger to get a golf club head formed with a shape corresponding to the mold space.

DETAILED DESCRIPTION OF THE INVENTION

Figure 1:
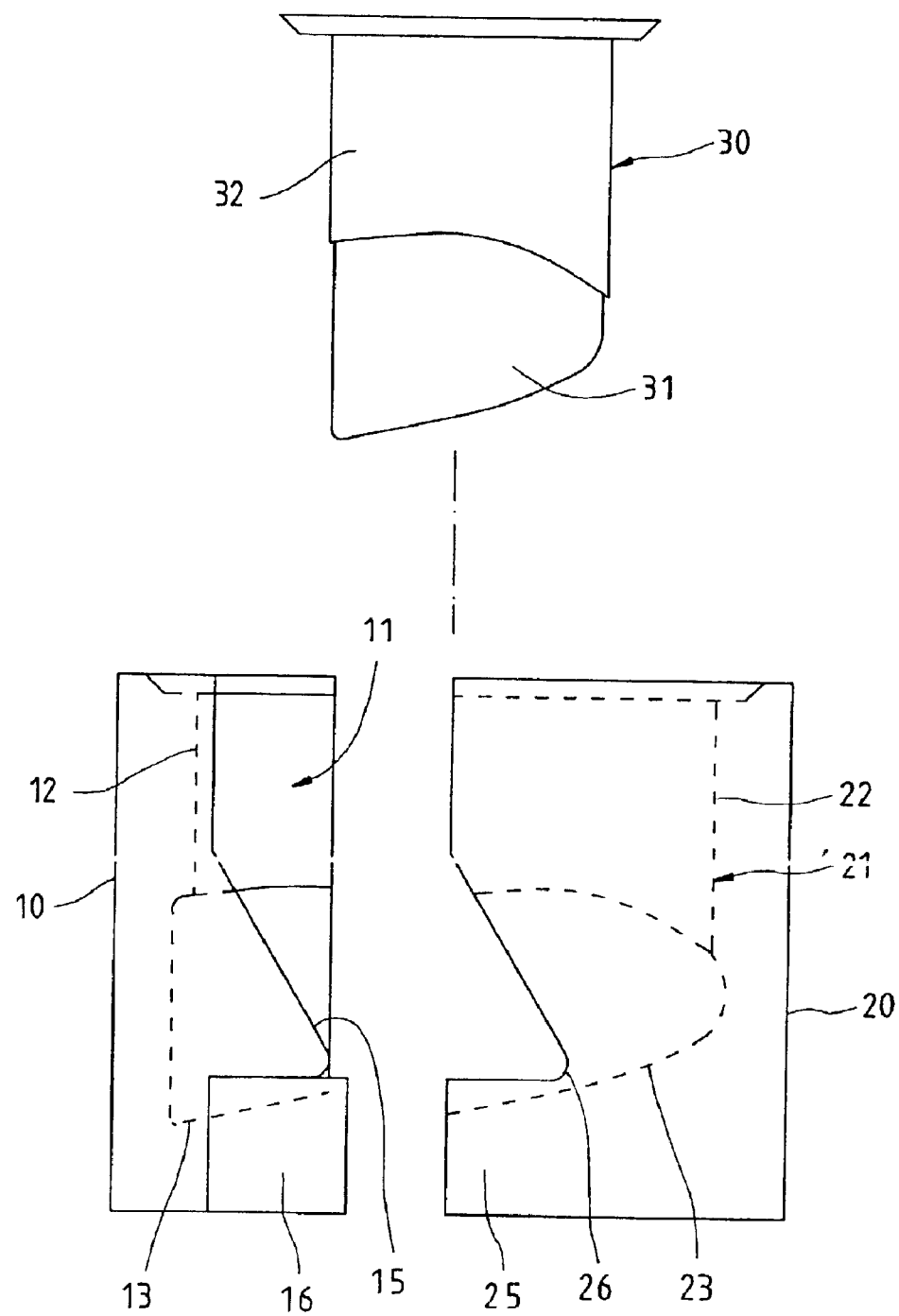
FIG. 1 is a schematic view of a first step of a preferred embodiment of the present invention, showing a first die, a second die and a mold plunger.
Figure 2:
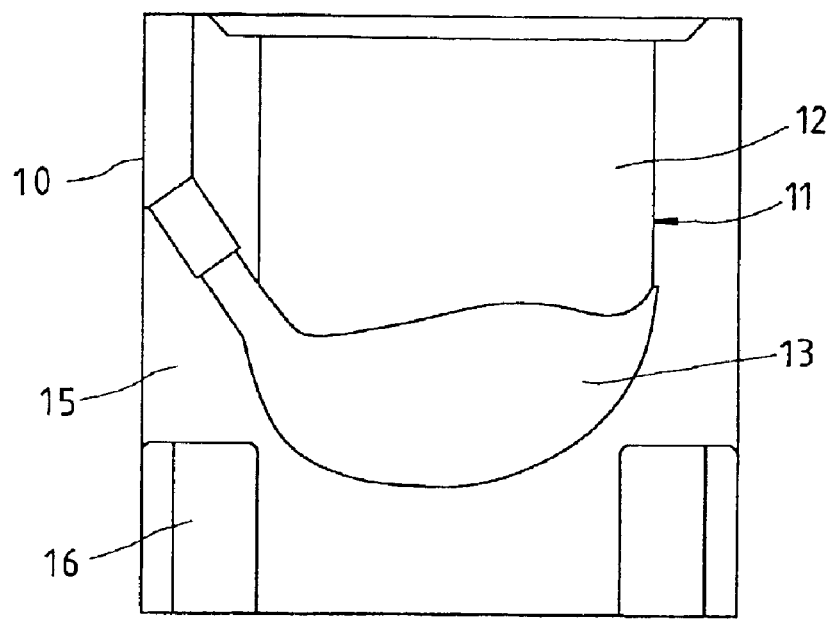
FIG. 2 is a lateral view of the first die of the first preferred embodiment of the present invention.
Figure 3:
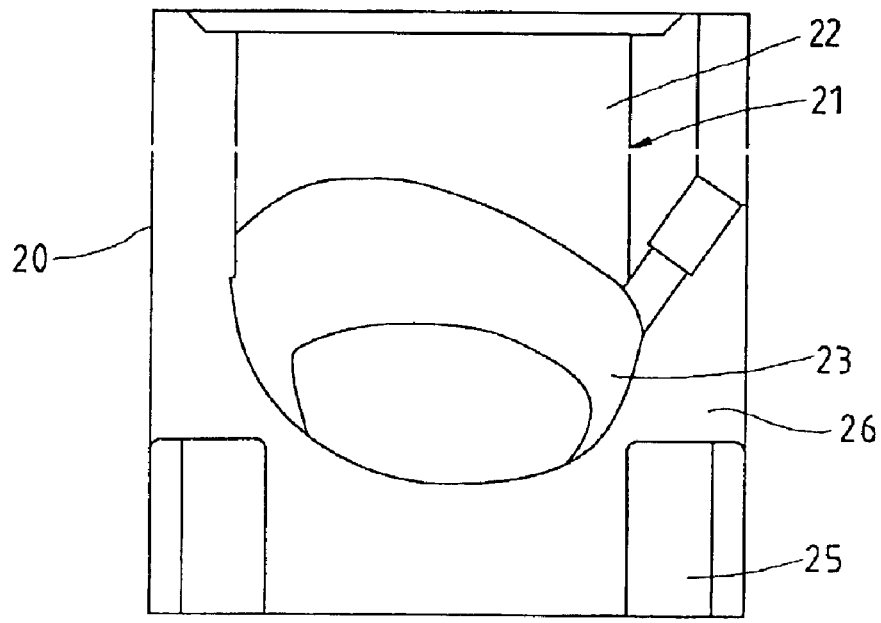
FIG. 3 is a lateral view of the second die of the first preferred embodiment of the present invention.
Figure 4:
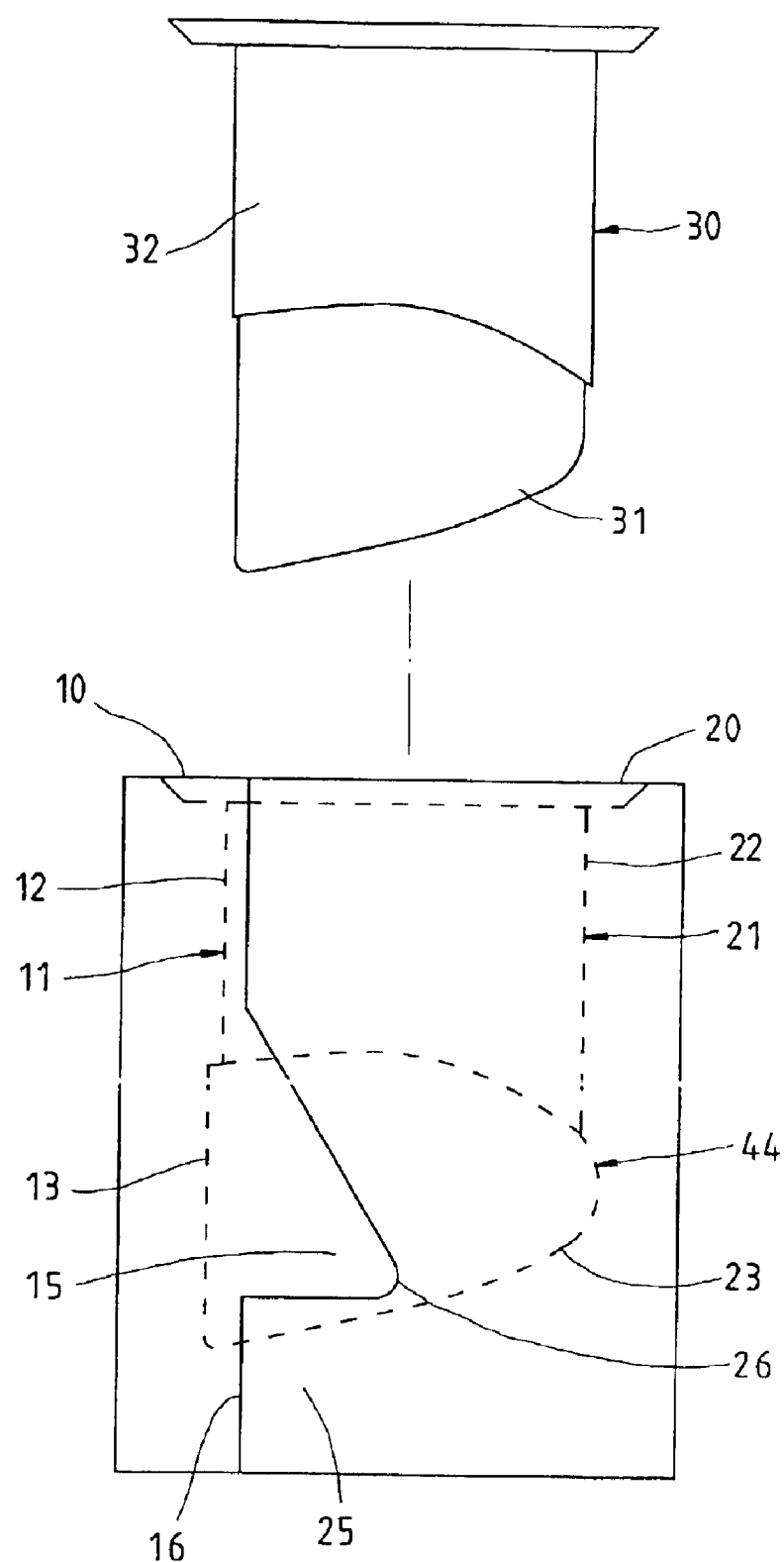
FIG. 4 is a sketch view of a second step of the first preferred embodiment of the present invention, showing a die cavity is form by combining the first die and the second die.
Figure 5:
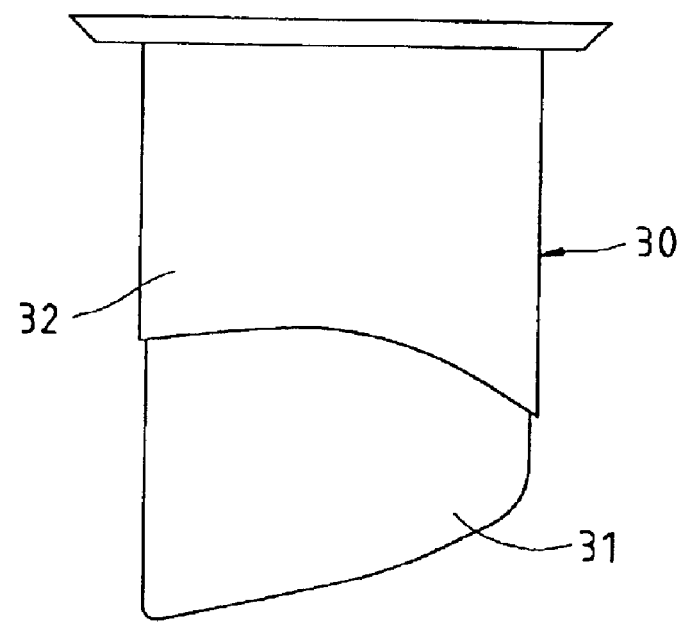
FIG. 5 is a schematic view of a third step of the first preferred embodiment of the present invention, showing a bulk compound being put into the die cavity.
Figure 5:
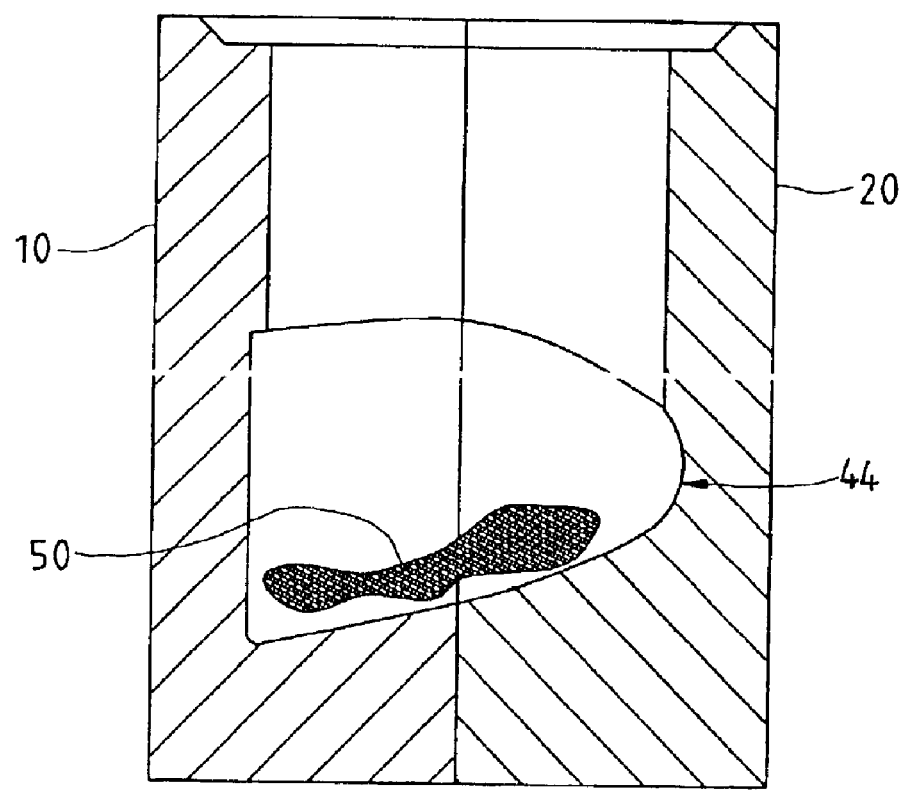
Figure 6:
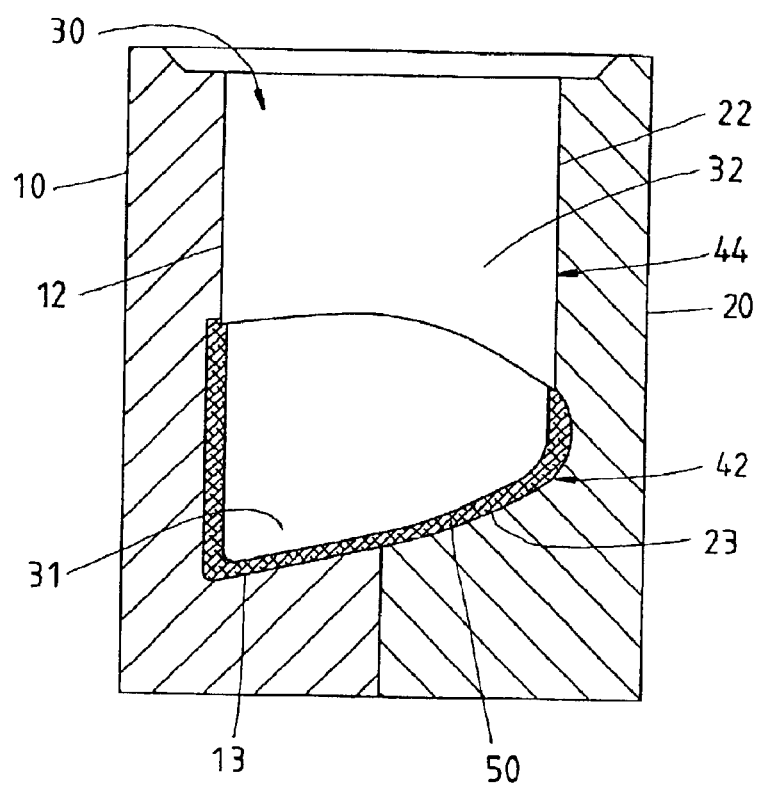
FIG. 6 is a schematic view of a fourth step of the first preferred embodiment of the present invention, showing the mold plunger compressing the bulk compound.

Please refer to FIGS. from FIG. 1 to FIG. 7, the first preferred embodiment of the present invention provides a method of manufacturing a golf club head comprising the following steps.

Step 1: Please refer to FIG. 1, arrange a first die 10, a second die 20 and a mold plunger 30 on an automatic machine tool (not shown). The first and the second dies 10 and 20 are arranged at same level, which are driven by hydraulic, pneumatic or mechanical driving machine for moving toward or away from each other. It can be done by both of the first and the second dies 10 and 20 are driven to move or one of which is fixed and the other one of which is driven to move. The first and the second dies 10 and 20 will be combined after they are driven to move towards. Please refer to FIG. 2 and FIG. 3, the first die 10 has a first cavity 11 at the side thereof facing the second die 20 and the second die has a second cavity 21 at the side thereof facing the first die 10. The first and the second cavities 11 and 21 have tunnel portions 12, 22 and recessed portions 13, 23 respectively. The tunnel portions 12 and 22 are extended from the top sides of the dies 10 and 20 to the recessed portions 13 and 23 such that the cavities 11 and 21 are communicated to outside. The first die 10 and second die 20 further comprises plug portions 15 and 25 and socket portions 16 and 26 respectively at the inner sides thereof. The plug portions 15 and 25 are engaged with the socket portions 16 and 26 when the dies 10 and 20 are combined.

The mold plunger 30 is arranged above the dies 10 and 20 and can be driven to move downwards. The mold plunger 30 has a mold portion 31 at a bottom side thereof and a plunger portion 32 at a topside thereof.

Step 2: Please refer to FIG. 4; drive the dies 10 and 20 to move them towards each others until the cavities 11 and 21 are combined to form a mold cavity 42 and the plug portions 15 and 25 are engaged with the socket portions 16 and 26 to make the dies 10 and 20 coupled fixedly and coupled in a precise position.

Step 3: Please refer to FIG. 5; put a bulk molding compound (B.M.C.) 50 into the mold cavity 42 of the dies 10 and 20. The compound can be carbon composite material.

Step 4: Please refer to FIG. 6; drive the mold plunger 30 moving downward into the mold cavity 42 defined by the dies 10 and 20 through the tunnel portions 12, 22 of the dies 10, 20 to make the mold portion 31 compress the B.M.C. 50 under a predetermined pressure; in the meantime, the plunger portion 32 will seal the tunnel portions 12, 22, such that a mold space 44 is formed at the space between the mold portion 31 of the mold plunger 30 and the recessed portions 13, 23 of the dies 10, 20, and is filled up by the B.M.C. 50. The mold space 44 has a shape of a wood club head with a neck thereon. The weight of the B.M.C. 50 put in the mold cavity 42 should be calculated precisely to make the B.M.C. 50 could fill the mold space 44 exactly.

Step 5: Please refer to FIG. 7; after the B.M.C. 50 solidified, remove the mold plunger 30 and then separate the dies 10 and 20 to get a golf club head 55 with a shape identical to the mold space.

With the steps as mentioned above, it can manufacture a golf club head made of composite material in an easier and more rapid way. The club head made from the method of the present invention is a unit rather than combining two or three pieces. It also can put a core (not shown) into the mold cavity of the dies initially to make the mold space has a complex shape.

Figure 8:
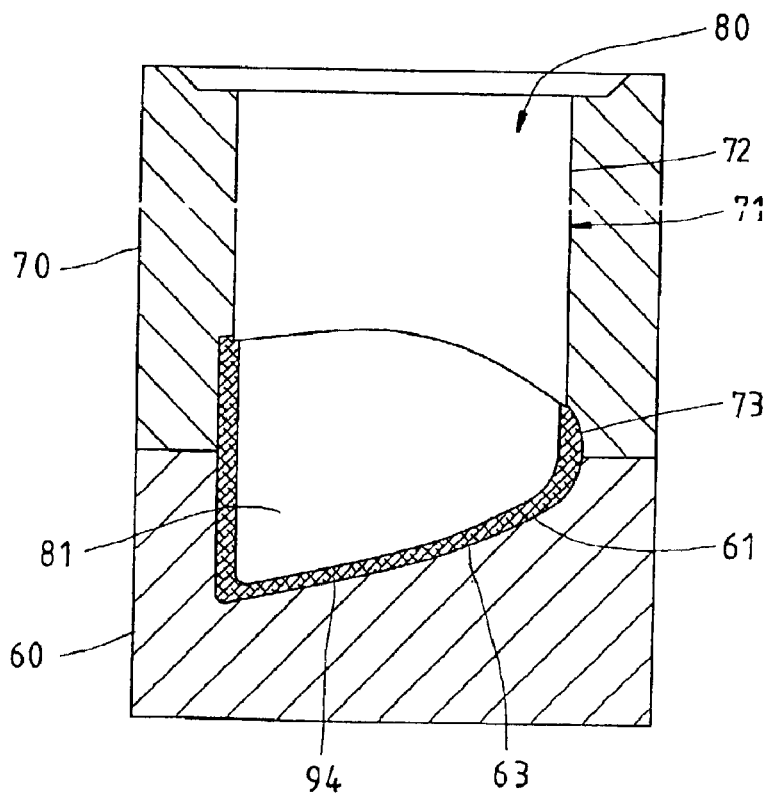
FIG. 8 is a schematic view of a second preferred embodiment of the present invention, showing dies and a mold plunger.
Figure 7:
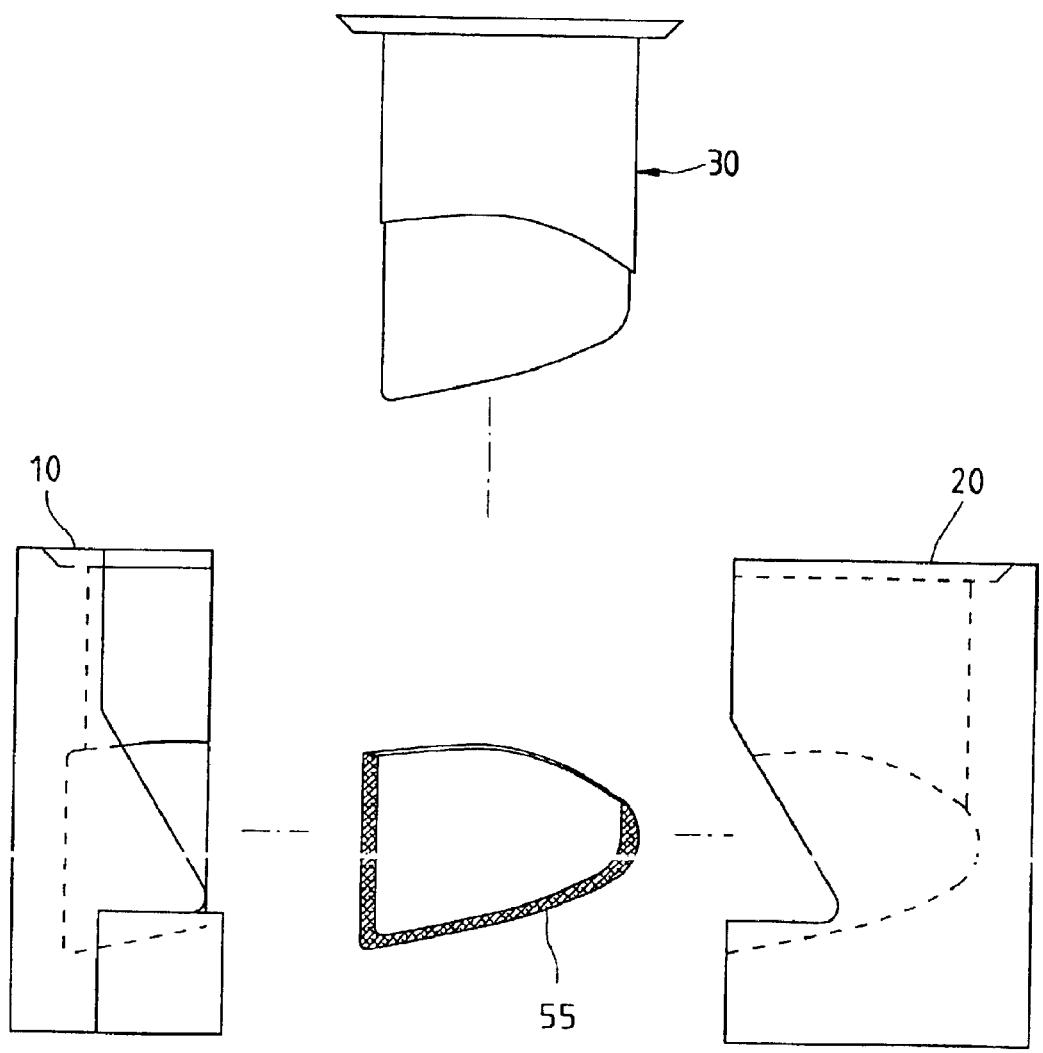
FIG. 7 is a schematic view of a fifth step of the first preferred embodiment of the present invention, showing removing the mold plunger and separating the first die and the second die to get a head shell.

Please refer to FIG. 8, the second preferred embodiment of the present invention comprises two dies 60 and 70 arranged in a vertical direction, wherein the bottom die 60 has a cavity 61 at topside thereof and the top die 70 has a cavity 71 at the under side thereof. The cavity 61 of the bottom die 60 includes only a recessed portion 63, that is, the cavity 61 does not have a tunnel portion. The cavity 71 of the top die 70 includes a recessed portion 73 and a tunnel portion 72 extending from the top side of the top die 70 to the recessed portion 73. The cavities 61, 71 of the dies 60, 70 are combined to form a mold cavity 92. A mold plunger 80 is arranged above the top die 70 to be inserted into the mold cavity 92 through the tunnel portion 72 of the cavity 71 such that a mold space 94 is formed at the space between a mold portion 81 of the mold plunger 80 and the recessed portions 63, 73 of the dies 60, 70.

What is claimed is:

1. A method of manufacturing a golf club head of composite material, comprising the steps of:

(a) arranging a first die, a second die and a mold plunger;

wherein said first die and said second die can be driven by an external force to combine with or separate from each other;

wherein said first die has a first cavity having a recessed portion at a side thereof and said second die has a second cavity having a recessed portion at the side facing said recessed portion of said first cavity of said first die such that the recessed portions of the first and second cavities are brought together when said first die and said second die are combined;

wherein at least one of the first and second cavities of said first and second dies is provided with a tunnel portion extending inwardly from a side of the respective die to the recessed portion of the respective cavity;

wherein said mold plunger has a mold portion at an end thereof and a plunger portion at the other end thereof and said mold portion is removably insertable into said recessed portions of the first and second cavities through said tunnel portion;

(b) combining said first die and said second die such that a mold cavity is defined by said first cavity of said first die and said second cavity of said second die;

(c) putting a bulk molding compound (B.M.C.) into the mold cavity;

(d) pushing said mold plunger into said mold cavity through the tunnel portion until the tunnel portion is sealed by the plunger portion of said mold plunger such that a mold space is defined in between the recessed portions of said first and second cavities and the mold portion of said mold plunger and compression molding said bulk molding compound within said mold space; and (e) solidifying said compressed bulk molding compound, and then separating said first die, said second die and said mold plunger to get a golf club head with a shape corresponding to the mold space.

2. The method as defined in claim 1, wherein each of said cavities of said dies has one said tunnel portion to be combined with each other.

3. The method as defined in claim 2, wherein said first die and said second die are arranged in horizontal direction and the tunnel portions of the cavities of said dies are extended from top sides of said dies.

4. The method as defined in claim 1, wherein only said first die has said tunnel portion extending from the side of the first die opposite the second die to the recessed portion of the first cavity of the first die.

5. The method as defined in claim 4, wherein said first die and said secod die are arranged in vertical direction and said first die is located at top and has the tunnel portion extending inwardly from a top side thereof.

6. The method as defined in claim 1, wherein said first die is provided with at least a plug portion and said second die is provided with at least a socket portion to be engaged with said plug portion when said dies are combined.

7. The method as defined in claim 1, wherein at least one core is put into the recessed portions of the cavities of said dies mold cavity before said mold plunger is inserted into said mold cavity.

8. The method of claim 1 wherein said mold space defined between the recessed portions of said first and second cavities, together with the mold portion of said mold plunger, in part define a ball-striking face of the golf club head to be compression molded, and said compressing step (d) comprises forming a said ball-striking face of said golf club head.

* * * * *